(12) United States Patent
Fütterer

(10) Patent No.: US 6,601,467 B1
(45) Date of Patent: Aug. 5, 2003

(54) MULTI-STAGE SPUR GEAR TRANSMISSION

(75) Inventor: Bodo Fütterer, Lucerne (CH)

(73) Assignee: Maxon Motor GmbH, Sexau (DE)

( * ) Notice: Subject to any disclaimer, the term of this patent is extended or adjusted under 35 U.S.C. 154(b) by 0 days.

(21) Appl. No.: 09/786,487

(22) PCT Filed: Feb. 21, 2000

(86) PCT No.: PCT/EP00/01398

§ 371 (c)(1),
(2), (4) Date: Jun. 11, 2001

(87) PCT Pub. No.: WO01/04512

PCT Pub. Date: Jan. 18, 2001

(30) Foreign Application Priority Data

Jul. 8, 1999 (DE) .......................... 199 31 818

(51) Int. Cl.⁷ ................................ F16H 1/12
(52) U.S. Cl. ........................ 74/421 A; 74/413
(58) Field of Search ............... 74/421 R, 421 A, 74/412 R, 413, 414

(56) References Cited

U.S. PATENT DOCUMENTS

| | | | |
|---|---|---|---|
| 1,521,882 A | | 1/1925 | H'Doubler |
| 2,831,364 A | | 4/1958 | Chambers et al. |
| 2,908,180 A | | 10/1959 | Swenson |
| 4,422,531 A | * | 12/1983 | Ohtomi et al. .............. 254/362 |
| 4,441,378 A | * | 4/1984 | Ponczek .................... 74/414 |
| 4,914,368 A | * | 4/1990 | Orton .................... 318/663 |
| 5,787,766 A | * | 8/1998 | Blach .................... 74/665 G |
| 6,106,362 A | * | 8/2000 | Keller et al. ................ 446/456 |
| 6,367,345 B1 | * | 4/2002 | Yeh ............................ 74/377 |

FOREIGN PATENT DOCUMENTS

| | | |
|---|---|---|
| DE | 4342185 | 6/1995 |
| EP | 0 371690 | 6/1990 |
| FR | 1.448.923 | 7/1966 |

* cited by examiner

*Primary Examiner*—David Fenstermacher
(74) *Attorney, Agent, or Firm*—Marshall, Gerstein & Borun

(57) ABSTRACT

A multistage spur-type gearing for small and miniature electric motors having a gearing housing and at least two gear shafts or axles held in the gearing housing, with spur gears of different diameters arranged on the gear shafts or axles. To achieve an extremely small construction at maximum reduction ratios in comparison with conventional spur-type gearings, at least two spur gears are fixedly connected to one another and combined to form a dual gear set, with the dual gear set rotatably supported on a gear axle made from a hard material, such as ceramics. At least one of the gear shafts should fixedly be held as a gear axle in the housing. An input shaft opening through which a motor shaft projects into the gearings is arranged to be substantially coaxial to the center axis of the gearing housing with which the gear shafts also extend in parallel and at some distance. Such a gearing makes it possible to arrange several reduction stages on one gear axle. Preferably, only two gear shafts or axles are used. Thus, in constructional terms, the present gearing is the smallest one among all conceivable variants of the gearing.

21 Claims, 2 Drawing Sheets

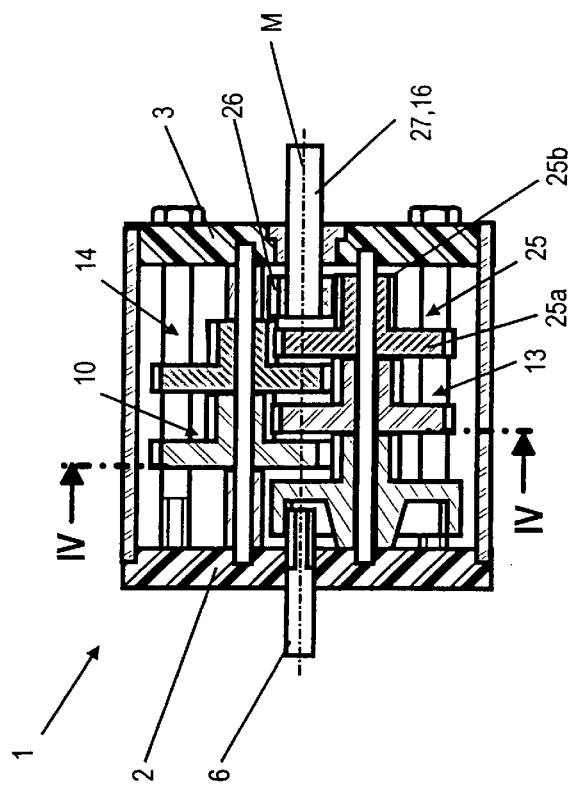
Fig. 3
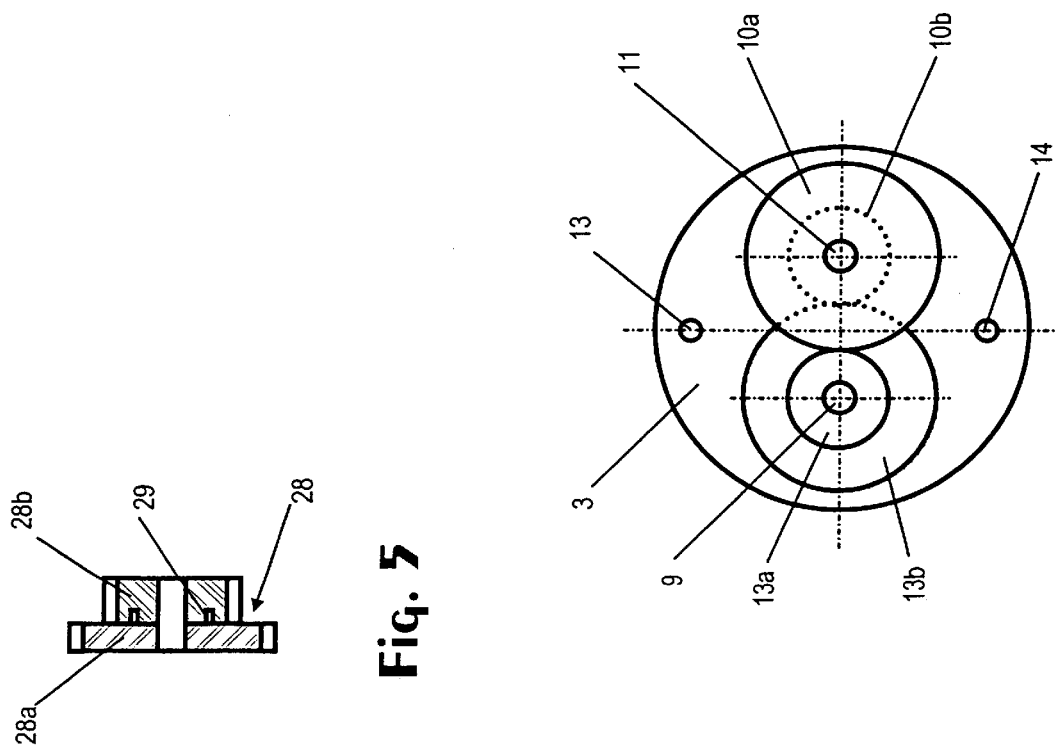
Fig. 5
Fig. 4

MULTI-STAGE SPUR GEAR TRANSMISSION

FIELD OF THE INVENTION

The present invention relates to a multistage spur-type gearing for small and miniature electric motors, comprising a gearing housing including an input shaft opening through which a motor shaft can be inserted into the interior of the housing for operating the spur-type gearing with the small or miniature electric motor, at least two gear shafts that are held in the gearing housing and extend in parallel with a center axis of the gearing, and spur gears of different diameters which are arranged on the gear shafts, at least one of the gear shafts being fixedly held as a gear axle in the gearing housing, and at least two spur gears being fixedly connected to one another and combined to form at least one dual gear set which is rotatably supported on a gear shaft or axle.

BACKGROUND OF THE INVENTION

Small and miniature electric motors are electric motors, most of the time d.c. motors, with small to very small dimensions, normally a diameter below 50 mm and a length below 150 mm, and a high motor output per weight. Small and miniature electric motors often rotate at a very fast speed and are normally used at speeds around 10,000 r.p.m. and more. To reduce the high speeds of said motors, use is made of spur-type gearings of a corresponding size which most of the time are directly flanged onto the motor housing. The transmission or gear ratios of the gearings or transmissions, which are respectively adapted to a specific motor, are often preset by the works for the customer. Motor and gearing can be ordered together and are also supplied jointly, being already pre-assembled as a unit. That is why the conventional spur-type gearings are most of the time provided with a cylindrical housing whose outer diameter corresponds to that of the associated motor. The front sides of the gearing are formed by flanges with which the gearing can be fastened to the motor or to another device.

In conventional spur-type gearings, the gear shafts are rotatably supported in the front flanges of the gearing housing. Each gear shaft has fixedly mounted thereon a spur gear which is in meshing engagement with a spur gear of a different diameter that is arranged on another gear shaft. In the conventional spur-type gearings, each of the spur gears is thus integrally rotating with the associated shaft. In conventional multistage spur-type gearings two spur gears of different diameters, a toothed gear and a pinion gear are thus arranged on a gear shaft at the most. The distance of the gear shafts of one reduction stage is defined by the gear ratio of the respective reduction stage.

In practice, the typical high speeds of small and miniature electric motors require a high reduction, i.e. a high ratio of input speed to output speed of the gearing. Such reduction ratios cannot be realized in a single gear stage on account of the predetermined small constructional dimensions. Therefore, in conventional spur-type gearings, the total gear ratio is distributed over several gear or transmission stages, so that at least two gear shafts are provided for.

A considerable drawback of the conventional structure of spur-type gearings is that the available space cannot be used in an optimum manner per reduction stage. Every additional reduction stage requires the installation of an additional gear shaft, which is bound to enlarge the gearing.

A further drawback of the gearings or transmissions normally used for small and miniature electric motors is the relatively large space required by said gearing at high reduction ratios, which is due to the fact that each gear shaft only carries one pair of toothed gears fixedly connected to said gear shaft. Therefore, a separate shaft has to be provided for each pair of toothed gears, which in the end leads to a relatively large number of parts in said conventional spur-type gearings. This creates relatively high costs during production and assembly.

To avoid said problems, the prior art discloses spur-type gearings in which at least two spur gears are rigidly connected to one another and combined to form at least one dual gear set. The dual gear set is rotatably supported on a gear shaft or axle. Since the dual gear set is supported in a rotatable manner, the gear axle or shaft can accommodate more than one transmission stage. As a result, a separate gear shaft need no longer be provided for every reduction stage.

For instance, DE 43 42 185 A1 describes a gearing having a number of meshing dual gear sets. A respective dual gear set is seated on a gear axle integrally formed by the gearing housing. However, the gearing according to DE 43 42 185 A1 has the drawback that the offset between motor and output shaft of the gearing is relatively large.

This problem is solved in the transmission of EP 371 690 A1 which is of a smaller constructional size than the transmission of DE 43 42 185 A1. However, this transmission is still relatively large, occupying more space than the motor itself. Because of their constructional size, the transmissions of EP 371 690 A2 and DE 43 42 185 A1 are not suited for today's small and miniature electric motors which should combine a minimum volume with maximum performance.

This drawback has been eliminated in the transmission of FR 1,448,923. In a cut transverse to the motor shaft, the transmission described therein has about the same cross-sectional area as the electric motor. Since the motor shaft in the transmission of FR 1,448,923 itself forms a transmission shaft with spur gears, it is very troublesome to separate the motor from the transmission shown therein. Use of such a transmission on an industrial scale (where many different transmissions with different reduction stages are mounted on the motor in accordance with the customers' desires just before delivery) is thereby made unprofitable. Furthermore, the transmission of U.S. Pat. No. 1,521,882 can also not be detached from the motor.

By contrast, U.S. Pat No. 2,831,364 shows a mechanical transmission which in the illustrated embodiment would not be useful because of the usual sizes of small and miniature electric motors and the high speeds thereof.

Finally, U.S. Pat. No. 2,908,180 forms the generic prior art for the subject matter of claim 1. This document shows a spur-type gearing which is screwed onto an induction motor. This gear mechanism has the drawback of a relatively large constructional volume in the radial direction. In this instance, too, the gear mechanism is larger than the associated electric motor.

It has been found in the case of all of the above-mentioned transmissions that there is a high wear at the high speeds as are arising during operation of today's small and miniature electric motors together with the power density achieved today.

SUMMARY OF THE INVENTION

It is there fore the object of the present invention to improve the above spur-type gearings by simple constructional measures in such a manner that even at high speeds they are hardly subject to any wear and can have the same constructional size as the corresponding electric motors.

According to the invention this object is achieved for a multistage spur-type gearing of the above-mentioned type in that the gear shaft or axle is made from a hard material and that the input shaft opening is arranged to be essentially coaxial to the center axis of the gearing housing.

Gear shafts which are stationary relative to the gearing housing and do not transmit any torques are designated as gear axles. Dual gear set primarily means the connection of two spur gears at the front sides thereof and at a distance that is as small as possible.

This solution is simple and permits the construction of small gearings or transmissions even at extremely high reductions and at high input speeds.

According to the invention the problem of premature wear is solved in that at least one gear axle is made from a hard material; hard materials within the meaning of the technical teaching of this invention permit the substantially dry support of the typically rapidly rotating spur gears on the gear shaft or axle without any significant wear. According to tests performed by the inventor, such a condition is primarily met by materials having such a high hardness as is e.g. inherent to ceramic or hard-metal materials. However, the term hard materials should also comprise other materials or classes of materials whose characteristics, in particular the hardness thereof, are comparable to those of e.g. ceramic materials.

Suitable hard materials can be found easily by performing service life tests (known per se) under load and operational conditions. The test conditions in these tests expediently comply with those prevailing during operation of the gearing together with small and miniature electric motors. Suitable hard materials for the gear axles and shafts can be determined by way of such tests in that under such test conditions they yield similar service lives as ceramic or hard-metal gear axles or shafts.

The reason why the spur-type gearing according to the invention is constructionally so small in comparison with the prior art is that according to the invention the input shaft opening is arranged to be coaxial to the center axis of the gearing.

As a consequence, the drive power is centrally introduced into the gearing and the gear shafts and axles with the reduction stages can be arranged in a space-saving manner around the input shaft opening. On the one hand, the available space can thus be exploited in an optimum manner; on the other hand, such a design makes it possible to fasten the gearing housing directly to the electric motor without the gearing housing projecting therefrom.

In a particularly advantageous development of the invention, the hard material can substantially contain a ceramic material. In tests performed by the inventor, gear axles or shafts, in particular, made from ceramics achieved the longest service lives in the support of the dual gear sets.

A fast and inexpensive manufacture of the gear axles or shafts and thus an accompanying cost reduction of the whole transmission can be achieved when according to a further advantageous development the gear axles or shafts are produced in a sintering process from a sintered material. All of the common hard materials according to the above definition can be sintered.

Among the hard materials according to the invention, zirconium oxide has turned out to be particularly suited due to its hardness and, in particular, high resistance to wear. Gear axles or shafts of zirconium have a particularly long service life.

Rotating gear axles can substantially be dispensed with because of the dual gear sets which are rotatably supported on the gear axle. That is why at least one gear axle can be rigidly connected to the gearing housing. In comparison with rotatably supported gear shafts requiring a separate support, this will reduce the costs because larger tolerances are acceptable for the accommodation of the gear axles in the housing in the case of a fixed connection, for instance by gluing, pressing or injection. The manufacturing efforts are thereby reduced.

In a further advantageous development, the gear axles can be aligned in parallel with one another. Since the gear axles are normally held in flanges of cylindrical housings at the front side, a symmetrical structure of the flange is possible in the case of gear axles oriented in parallel with one another.

A preferred design of the invention can be obtained in that at least two dual gear sets are made identical. Such a construction yields a simple design of the gearing because, in contrast to the conventional spur-type gearings, the gearing of the invention may be composed of standardized toothed gear sets. Furthermore, in this design of the invention, a stepping down or a stepping up of the gearing can easily be changed by adding further dual gear sets.

Diametrically opposed dual gears exploit the available space not only in an optimum way, but also permit an easy fastening to a motor by means of two continuous screws arranged at a right angle relative to the gear axles.

In a further advantageous development the dual gear sets may comprise an integrally formed toothed gear section and an integrally formed pinion section, the pinion section having a smaller diameter than the toothed gear section. Such integral dual gear sets can be produced by means of known production methods, such as sintering or injection molding, from a great number of materials in a simple and inexpensive manner.

In a further advantageous development a dual gear set which consists of a hardened material, preferably a metal material, in particular sintered iron having a large open-pore volume, similar to a sintered bearing, has turned out to be useful in combination with the gear axle or shaft made from a hard material according to the invention. The combination of a hardened material for a spur gear and the ceramic shaft effects a particularly long service life. In contrast to the hub-shaft combinations that are standard in the construction of transmissions, the transmission axle is made from a harder material according to the invention than the toothed gear that is rotatably supported on the gear axle or shaft.

To permit a connection which can easily and rapidly be established between the electric motor and the spur-type gearing during operation with a small or miniature electric motor, the gearing housing may further be arranged to be coaxial to a motor shaft of the small or miniature electric motor during operation.

The power output from the small or miniature electric motor is first supplied to an input stage, i.e. a first meshing pair of spur gears. In a further advantageous development of the invention, the input stage which is in engagement with the motor shaft can be designed as a ring gear seated on a gear axle or shaft. With a small constructional size, a maximum reduction can already be achieved in the first stage with a ring gear so that the driven side of the input stage is already rotating at a slower speed and can thus be supported more easily on the gear axle or shaft. Moreover, optimum tooth engagement ratios are obtained that are equal to a helical toothing. Furthermore, the noise level can be considerably reduced by the "softer" tooth engagement. Since the load on the teeth is still small in the first stage, the ring gear can also be made from a suitable plastic material.

In a further advantageous embodiment, there may be provided an output shaft of the multi-stage spur-type gearing which is led to the outside for coupling the power transmitted by the gearing through an output shaft opening mounted on the gearing housing, and which is rotatable relative to the gearing housing. In a further advantageous development, the output shaft is formed at least sectionwise as a hollow shaft in which a gear axle or shaft is received at least in sections. This also effects a very small constructional size.

Furthermore, it may be advantageous that a gear axle or shaft is designed as an output shaft that is rotatably supported in the gearing housing. In this design a gear shaft serves both the support of dual gear sets rotatably held on said gear shaft and as an output shaft; a toothed gear at the output stage side must then of course be connected to said gear shaft in a substantially rigid manner.

In a further advantageous development, a bearing bush in which the output shaft is rotatably supported in the gearing housing may be arranged between the gear shaft and the gearing housing. A longer service life is thereby achieved with the spur-type gearing of the invention. In particular, the bearing bush may be made from a material adapted to ceramic axles or shafts, resulting in small coefficients of friction and little wear between the shaft and the ceramic axles. By contrast, a direct support of the ceramic shafts in the flanges would effect increased wear of the flange in the case of specific flange materials.

BRIEF DESCRIPTION OF THE DRAWINGS

In a further advantageous development, the motor shaft of the electric motor may be toothed and directly mesh with the input stage of the transmission. On account of the small diameter of the motor shaft, this yields not only a high reduction at the input side, but also a smooth running because there can be no offset in the middle as in the case of a pinion gear mounted on the motor shaft. On account of the small diameter of the motor shaft the reduction of the input stage is substantial from the very start, so that the input stage can be supported more easily on the gear axle or shaft and higher gear input speeds can be realized. The motor output to the gearing can be enhanced by said measure.

Structure and function of the multistage spur-type gearing of the invention shall now be explained in more detail with reference to embodiments taken in conjunction with the attached drawings, in which:

FIG. 3 is a sectional view showing a third embodiment of the spur-type gearing according to the invention;

FIG. 4 is a schematic front view of a spur-type gearing according to the invention, taken along line IV—IV of FIG. 3; and FIG. 5 shows a modification of a dual gear set for a spur-type gearing according to the invention.

In the figures described hereinafter, like components are provided with like reference numerals in the various embodiments.

FIG. 1 shows a first embodiment of the spur-type gearing 1 according to the invention. The spur-type gearing 1 comprises a housing which is composed of a flange 2 at the motor or input side and of a flange 3 at the output side. Flanges 2, 3 are interconnected by means of an outer cylindrical housing part 4. The two flanges 2, 3 are circular discs. Flange 2 at the motor side comprises an input shaft opening 5 having a motor shaft 6 guided therethrough. The motor shaft 6 pertains to an electric motor (not shown in FIG. 1) whose front side is detachably connected to the flange 2, e.g. by means of screws. The motor shaft 6 is provided at its end with a front toothing 7.

Figures 1, 2:
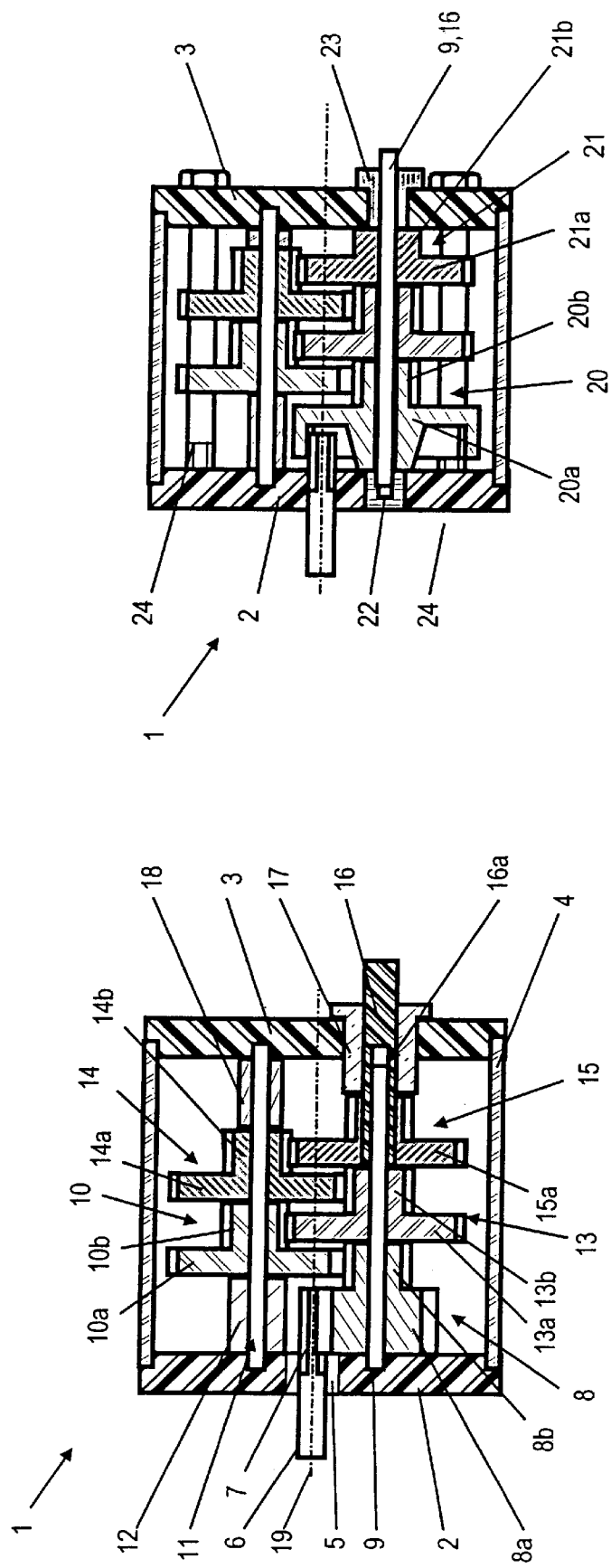
FIG. 1 is a sectional view showing a first embodiment of the multistage spur-type gearing according to the invention.
FIG. 2 is a sectional view showing a second embodiment of the multistage spur-type gearing according to the invention.

The front toothing 7 of the motor shaft is in meshing engagement with a spur gear 8, thus forming the input stage of the spur-type gearing 1 together with said spur gear 8. The spur gear 8 is designed as a dual gear set in the case of which a spur gear 8a and a pinion gear 8b are interconnected. The diameter (pitch circle) of the pinion gear 8b is smaller than that of the toothed gear 8a. Since the spur-type gearing 1 is a reducing gearing, the diameter of the spur gear 8a is larger than the diameter of the motor shaft 6.

The dual gear set 8 of the input stage is rotatably supported on a gear shaft 9 which is fixed against rotation within the flange 2 at the motor side. Apart from the torques caused by the friction of the dual gear sets, the gear shaft 9 is without any torques.

The pinion gear 8b of the dual gear set 8 is in meshing engagement with the spur gear 10a of a further dual gear set 10. Said dual gear set 10 is rotatably supported on a gear shaft 11 which, like the gear shaft 9, is substantially without any torques. The gear shaft 11 is pressed into the flanges 2 and 3 and thereby fixedly held. The dual gear set 10 is spaced via s spacer sleeve 12 from the flange 2 at the drive side in such a manner that it meshes with the pinion gear 8b of the dual gear set 8 without colliding with the motor shaft 6 or the toothed gear 8a.

The dual gear set 10 on the second stationary gear shaft 11 also forms a toothed gear 10a and a pinion gear 10b in an integral manner. The pinion gear 10b is in engagement with a toothed gear 13a of a dual gear set 13 which is rotatably supported on the gear shaft 9.

The dual gear set 13 integrally forms a pinion gear 13 in the same way, the pinion gear 13b meshing with a toothed gear 14a of a further dual gear set 14. The dual gear set 14 is rotatably supported on the gear shaft 11 and is axially resting on the end section of the dual gear set 10 that is oriented towards the driven side.

A pinion gear 14b, which is made integral on the dual gear set 14, is in engagement with a toothed gear 15a of a further gear 15. The gear 15, in turn, is rotatably supported on the gear shaft 9. The dual gear sets 10, 13 and 14 are identical.

The output gear 15 is fixedly connected to a driven shaft 16. Towards the drive side of the spur-type gearing 1 the driven shaft 16 forms a hollow shaft section 16a in which the gear shaft 9 is rotatably received. A bearing bush 17 is inserted into an output shaft opening (not designated) between the flange 3 at the driven side and the output shaft 16. The bearing bush 17 rotatably supports the driven shaft 16 in the flange 3 at the driven side. The bearing bush 17 is made from a material whose coefficient of friction with the material of the driven shaft 16 permits a running operation with minimal frictional losses and minimal wear.

A spacer sleeve 18 is mounted between the dual gear set 14 and the flange 3 at the driven side so that on the fixed gear shaft 11 the dual gear set 10 at the drive side and the dual gear set 14 resting on the dual gear set at the drive side are held between the spacer sleeve 12 (at the drive side) and the spacer sleeve 18 to be axially substantially non-displaceable, but rotatable relative to the gear shaft. To reduce the friction at the front sides between the spacer sleeves 12, 18 and the dual gear sets 10, 14, it is of advantage when the members 10, 12, 14, 18 have a slight play in the axial direction.

On the fixed gear shaft 9, the individual members 8, 13, 15 also have a slight play in the axial direction. The dual gear set 8 at the input side and the dual gear set 13 as well as the output gear 15 are axially held by the flange 2 and the driven shaft 16, which is held in the bearing bush 17. To reduce the friction between the dual gear set 8 at the input side and the flange 2, a step may be provided on the dual gear set 8 or on the flange 2, the step being arranged between dual gear set 8 and flange 2 and reducing the contact surface and thus the friction between said two members. A similar measure may be taken for the spacer sleeves 12, 13.

In the embodiment of FIG. 1, power flows from the toothing 7 of the motor shaft 6 via the toothed gear 8a and the pinion gear 8b to the toothed gear 10a and the pinion gear 10b. Power further flows from the pinion gear 10b to the toothed gear 13a and its pinion gear 13b. Power flows from the pinion gear 13b to the toothed gear 14a and the pinion gear 14b thereof. Power further flows from the pinion gear 14b to the toothed gear 15 and from there to the driven shaft 16. Since the dual gear sets are supported to be rotatable relative to one another and on the respective gear shaft 9, 11, each of the dual gear sets is rotating at a different speed. Hence, the invention is based on the idea that a dual gear set simultaneously forms the driven toothed gear of a first gear stage (gearing down or gearing up) and the driving toothed gear of a subsequent second gear stage. To obtain advantageous frictional values and long running times in the case of dual gear sets of metal, the two gear shafts 9, 11 are made from sintered zirconium oxide and the gear sets from open-pore, hardened and oil-impregnated sintered iron parts.

The gear shafts 9, 11 of the first embodiment extend in parallel with the motor shaft 6. The motor shaft 6 extends coaxial to the center line 19 of the spur-type gearing 1. In FIG. 1, the dual gear sets 10, 13 and 14 and possible further dual gear sets are identical.

It already becomes apparent from the first embodiment that the advantage of the spur-type gearing of the invention is that several reduction stages can be arranged on only two gear shafts 9, 11. Various overall reductions of the spur-type gearing can easily be achieved by arranging a respectively different number of dual gear sets on the two gear shafts 9, 11. For instance, the total reduction of the embodiment shown in FIG. 1 can easily be changed by omitting or adding one or several dual gear sets.

Because of the confined constructional space of such a spur-type gearing 1, which is intended for use in small or miniature electric motors, a hydrodynamic lubrication cannot take place in the gearing. Therefore, the dual gear sets are running on the gear shafts 9, 11 in an almost dry state.

FIG. 2 shows a second embodiment of the set of spur gears according to the invention. The principle of said set of spur gears corresponds to the principle of the first embodiment. That is why only the differences with respect to the first embodiment shall be discussed in more detail in the following.

For instance, in the second embodiment shown in FIG. 2, the driving action takes place via a ring gear 20a, which forms part of a dual gear set 20 at the input stage. The hub section of the ring gear 20a is designed as a spacer sleeve. Furthermore, like in the first embodiment, a pinion section 20b is integrally formed on the dual gear set 20. Thanks to the ring gear 20a, it is already possible in the first reduction stage to achieve even larger gear reductions than in the case of a spur gear. Thus the dual gear set 20 rotates at a slower pace and can be supported more easily on the gear shaft 9 which is rotatably held in the gear housing. In this gear variant, too, the gear shaft may be designed as a stationary axle.

The gear shaft 9 according to the second embodiment is rotatably supported in the flanges 2 and 3 and fixidly connected to the toothed gear 21a, which is part of the last reduction stage. The toothed gear 21a has integrally formed therewith a spacer sleeve 21 which extends up to the flange at the driven side. Alternatively, the sleeve section may also be designed as a separate component which need not be fixidly connected to the gear shaft 9.

The gear shaft 9 is held via a bearing bush 22 to be rotatable in the flange 2 and via a bearing bush 23 to be rotatable in the flange 3 and extends through the flange 3 to the outside of the motor. Thus, the gear shaft 9 directly forms the output shaft and transmits the output torque.

FIG. 2 further shows two fastening screws 24 by which flange 2 is connected to flange 3. Since in the spur-type gearing 1 of the invention, only a total of two stationary gear shafts 9, 11 are provided, there is no lack of space—in contrast to the conventional spur-type gearings with rotating shafts and one reduction stage per shaft—so that there is enough space for said screws extending through the interior of the spur-type gearing 1.

In the second embodiment, FIG. 2 the relative rotational speed between the gear shaft 9 and the first reduction stage with the ring gear 20a is further reduced by the measure that the gear shaft 9 is rotating itself.

In the first embodiment of FIG. 1 and in the second embodiment of FIG. 2, drive side and driven side of the spur-type gearing 1 are not in alignment. A spur-type gearing 1 in which drive side and driven side are arranged in alignment along the center axis M of the spur-type gearing 1 is shown in the third embodiment of FIG. 3. In this instance, too, only the differences with respect to the two above-explained embodiments shall be discussed.

In contrast to the second embodiment, the last dual gear set is made integral with a spur gear 25a and a pinion gear 25b. The pinion gear 25b is in engagement with a toothing 26 of the driven shaft 27. Although FIG. 3 shows a dual gear set differing from the dual gear sets 10, 13, 14, 15, a dual gear set 25 which is identical with said dual gear sets may here also be used without any restrictions.

In the embodiments which have so far been described, the dual gear sets have each been made integral (e.g. by way of die-casting, MIM technique or a sintering method) with a toothed gear section and a pinion section whose diameter (pitch circle) is smaller than that of the toothed gear. However, it is possible to produce the toothed gears and the pinion gears from separate components without any limitation of the operability of the spur-type gearing 1.

FIG. 4 is a schematic representation showing a front section through the spur-type gearing of FIG. 3 along line IV—IV with the viewing direction along the arrows. The two gear axles or shafts 9, 11 are diametrically offset relative to the center line M of the spur-type gearing 1. An optimum use of the available space is thereby made possible, so that there is enough space for two passage screws 13, 14. The spur-type gearing can be secured by means of said screws to a motor or another device.

FIG. 5 shows a dual gear set consisting of separate components. A dual gear set 28 consists of a pinion gear 28b fixidly connected to the toothed gear 28a. The toothed gear 28a comprises pins 29 which are distributed along a circle extending in a direction coaxial to the toothed gear 28a. Said pins engage into corresponding openings of the pinion gear 28b. Instead of the pins, it is of course possible to use other detachable and form-fitting connections, but also non-detachable connections established by adhesion or cohesion.

Since toothed gear 28a and pinion gear 28b are separated, any desired dual gear sets may be combined and the total reduction ratio of the spur-type gearing 1 can exactly be adapted to the respective needs.

Expediently, however, the output speed of the gearing is realized by an adapted motor speed. The constructional solution, especially with a toothed motor shaft, consists in the great variety of motor speeds so that different output speeds can be realized with identical gearings.

I claim:

1. A multistage spur-type gearing for small-sized electric motors comprising in combination a gearing housing including an input shaft opening through which a motor shaft can be inserted into the interior of said housing for operating the spur-type gearing with the small electric motor, at least two gear shafts that are held in said gearing housing and extend at a distance from and in parallel with the center axis of said gearing housing, and spur gears of different diameters which are arranged on said gear shafts, at least one of said gear shafts being fixedly held as a gear axle in said gearing housing, and at least two spur gears being fixedly connected to one another and combined to form at least one dual gear set which is rotatably supported on a said gear shaft, said gear shaft (9, 11) being made from a sintered material in a sintering process and substantially containing a ceramic material, and said input shaft opening arranged to be substantially coaxial to the center axis (M) of said gearing housing (2, 3).

2. The multistage spur-type gearing according to claim 1, wherein said motor shaft (6) of the electric motor is toothed.

3. The multistage spur-type gearing according to claim 1, wherein said gear shafts are axles.

4. The multistage spur-type gearing according to claim 1, wherein said gear shafts (9, 11) are made from zirconium oxide.

5. The multistage spur-type gearing according to claim 1, wherein said gear shafts (9, 11) are oriented in parallel with one another.

6. The multistage spur-type gearing according to claim 1, wherein said gear shafts (9, 11) are arranged to be diametically opposed relative to said center axis (M) of the spur-type gearing (1).

7. The multistage spur-type gearing according to claim 1, wherein at least two dual gear sets (8, 10, 13, 14, 25, 28) are made identical with one another.

8. The multistage spur-type gearing according to claim 7, wherein at least one said dual gear set (8, 10, 13, 14, 25) integrally forms a toothed gear section (8a, 10a, 13a, 14a, 25a) and a pinion section (8b, 10b, 13b, 14b, 15b, 25b), said pinion section (8b, 10b, 13b, 14b, 25b) having a smaller diameter than said toothed gear section (8a, 10a, 13a, 14a, 25a).

9. The multistage spur-type gearing according to claim 7, wherein at least one said dual gear set (8, 10, 13, 14, 25, 28) is made from a sintered material by means of a sintering process.

10. The multistage spur-type gearing according to claim 7, wherein at least one dual gear set (8, 10, 13, 14, 25, 28) is produced by means of an injection molding process.

11. The multistage-type gearing according to claim 7, wherein at least one said dual gear set (8, 10, 13, 14, 25, 28) is made from a hardened material.

12. The multistage spur-type gearing according to claim 11, wherein said hardened material is metal material.

13. The multistage spur-type gearing according to claim 1, wherein during operation said gearing housing (2, 3, 4) is arranged to be coaxial to said motor shaft 6) of the small electric motor.

14. The multistage spur-type gearing according to claim 1, and wherein there is further provided an input stage which is engagement with said motor shaft (6) and is designed as a ring gear (20a) which is seated on said gear shaft (9).

15. The multistage spur-type gearing according to claim 1, wherein said gearing housing (2, 3, 4) is made substantially cylindrical.

16. The multistage spur-type gearing according to claim 1, and wherein there is further provided an output shaft (16) which is guided to the outside through an output shaft opening provided on said gearing housing (2, 3, 4) and is rotatable relative to said gearing housing (2, 3, 4).

17. The multistage spur-type gearing according to claim 16, and wherein there is further provided an input stage which is in engagement with said motor shaft (6), and wherein said input stage is arranged on said gear shaft (9) on which said output shaft (16) is also arranged.

18. The multistage spur-type gearing according to claim 17, wherein said gear shaft (9, 11) is designed as said output shaft and rotatably supported in said gearing housing (2, 3, 4).

19. The multistage spur-type gearing according to claim 16, and a bearing bush (17, 23) in which said output shaft (16) is rotatably supported in said gearing housing (2, 3, 4) and is arranged between said gearing housing and said output shaft.

20. The multistage spur-type gearing according to claim 16, wherein said output shaft (16) is designed at least in sections as a ring gear (16a) in which said gear shaft (9, 11) is rotatably received at least sectionwise.

21. The multistage spur-type gearing according to claim 20, and wherein said gear shaft is rotatably received relative to said output shaft.

* * * * *

UNITED STATES PATENT AND TRADEMARK OFFICE
CERTIFICATE OF CORRECTION

PATENT NO. : 6,601,467 B1 Page 1 of 1
DATED : August 5, 2003
INVENTOR(S) : Bodo Fütterer It is certified that error appears in the above-identified patent and that said Letters Patent is hereby corrected as shown below:

<u>Column 9,</u>
Line 26, please delete "shaft opening arranged" and replace with -- shaft opening being arranged --.

<u>Column 10,</u>
Line 8, please delete "multistage-type" and replace with -- multistage spur-type --.

Signed and Sealed this

Twenty-second Day of March, 2005

JON W. DUDAS
*Director of the United States Patent and Trademark Office*